(12) United States Patent
Kazmi et al.

(10) Patent No.: US 11,469,833 B2
(45) Date of Patent: *Oct. 11, 2022

(54) METHOD APPARATUS AND NETWORK NODE FOR APPLYING CONDITIONAL CQI REPORTING

(71) Applicant: Telefonaktiebolaget LM Ericsson (publ), Stockholm (SE)

(72) Inventors: Muhammad Kazmi, Bromma (SE); Jingyi Liao, Beijing (CN); Rong Hu, Beijing (CN); Stefan Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 409 days.

This patent is subject to a terminal disclaimer.

(21) Appl. No.: 15/097,710

(22) Filed: Apr. 13, 2016

(65) Prior Publication Data

US 2016/0226604 A1    Aug. 4, 2016

Related U.S. Application Data

(63) Continuation of application No. 14/065,740, filed on Oct. 29, 2013, now Pat. No. 9,338,676, which is a
(Continued)

(51) Int. Cl.
  *H04B 17/24*  (2015.01)
  *H04L 1/00*   (2006.01)
  (Continued)

(52) U.S. Cl.
  CPC .......... *H04B 17/24* (2015.01); *H04L 1/0026* (2013.01); *H04L 1/0027* (2013.01); *H04W 24/04* (2013.01);
  (Continued)

(58) Field of Classification Search
  None
  See application file for complete search history.

(56) References Cited

U.S. PATENT DOCUMENTS 7,330,700 B2    2/2008  Aizawa
7,898,948 B2    3/2011  Digirolamo
(Continued)

FOREIGN PATENT DOCUMENTS

EP    1 848 166 A2    10/2007
EP    1 859 569 A1    11/2007
(Continued)

OTHER PUBLICATIONS

R2-071394, 3GPP TSG-RAN WG2 Meeting #57bis R2-071394, St. Julian, Malta, Mar. 26-30, 2007 (Year: 2007).*
(Continued)

*Primary Examiner* — Alex Skripnikov
(74) *Attorney, Agent, or Firm* — Patent Portfolio Builders PLLC

(57) ABSTRACT

A method for limiting Channel Quality Indicator (CQI) reporting from a User Equipment to a network node is provided where a User Equipment can transmit CQI reports to a network node, such as e.g. a base station, when the User Equipment is operating in low transmission and/or low reception activity mode. A limited CQI reporting is obtained by triggering the reporting according to one or more predefined rules, which to at least some extent depend on CQI specific information provided to the User Equipment from the network node. A User Equipment and a network node adapted to operate in accordance with the suggested method are also provided.

16 Claims, 5 Drawing Sheets

Related U.S. Application Data continuation of application No. 13/287,501, filed on Nov. 2, 2011, now Pat. No. 8,599,816, which is a continuation of application No. 12/337,298, filed on Dec. 17, 2008, now Pat. No. 8,149,809, which is a continuation of application No. PCT/SE2008/051383, filed on Dec. 1, 2008.

(60) Provisional application No. 61/016,081, filed on Dec. 21, 2007.

(51) Int. Cl.
| | | |
|---|---|---|
| *H04W 24/10* | (2009.01) | |
| *H04W 52/02* | (2009.01) | |
| *H04W 24/04* | (2009.01) | |
| *H04W 28/06* | (2009.01) | |
| *H04W 74/08* | (2009.01) | |

(52) U.S. Cl.
CPC ....... *H04W 24/10* (2013.01); *H04W 52/0232* (2013.01); *H04W 28/06* (2013.01); *H04W 74/085* (2013.01); *Y02D 30/70* (2020.08)

(56) References Cited

U.S. PATENT DOCUMENTS

| | | | |
|---|---|---|---|
| 7,961,700 B2 | 6/2011 | Malladi et al. | |
| 8,149,809 B2* | 4/2012 | Kazmi | H04L 1/0026 370/341 |
| 8,599,816 B2* | 12/2013 | Kazmi | H04B 17/24 370/341 |
| 2002/0133606 A1 | 9/2002 | Mitomo | H04L 12/2602 709/229 |
| 2003/0123396 A1* | 7/2003 | Seo | H04B 1/707 370/252 |
| 2003/0185193 A1 | 10/2003 | Choi et al. | |
| 2005/0201296 A1 | 9/2005 | Vannithamby et al. | |
| 2007/0047502 A1 | 3/2007 | Marinier et al. | |
| 2007/0189304 A1 | 8/2007 | Rosa | |
| 2007/0253473 A1 | 11/2007 | Ishii et al. | |
| 2007/0259671 A1 | 11/2007 | Cheng et al. | |
| 2008/0045231 A1 | 2/2008 | Kuroda et al. | |
| 2008/0049667 A1 | 2/2008 | Rong et al. | |
| 2008/0081634 A1* | 4/2008 | Kaikkonen | H04L 1/0026 455/452.1 |
| 2008/0084844 A1* | 4/2008 | Reznik | H04L 1/0025 370/330 |
| 2008/0232310 A1* | 9/2008 | Xu | H04W 52/0216 370/329 |
| 2008/0287138 A1* | 11/2008 | Yoon | H04W 72/085 455/452.2 |
| 2009/0054055 A1 | 2/2009 | Iwamura et al. | |
| 2009/0073958 A1 | 3/2009 | Xu | |
| 2009/0141648 A1 | 6/2009 | Imamura et al. | |
| 2009/0163199 A1 | 6/2009 | Kazmi et al. | |
| 2009/0310693 A1* | 12/2009 | Baker | H04B 7/0617 375/260 |
| 2010/0015982 A1 | 1/2010 | Wager et al. | |
| 2010/0202306 A1* | 8/2010 | Jersenius | H04B 17/0067 370/252 |
| 2011/0076999 A1 | 3/2011 | Kazmi et al. | |
| 2012/0044831 A1 | 2/2012 | Kazmi et al. | |
| 2014/0056225 A1 | 2/2014 | Kazmi et al. | |

FOREIGN PATENT DOCUMENTS

| | | |
|---|---|---|
| JP | 4-200032 A | 7/1992 |
| JP | 2007-202096 A | 8/2007 |
| WO | 2006/097832 A1 | 9/2006 |
| WO | 2007013457 A1 | 2/2007 |
| WO | 2007/024780 A2 | 3/2007 |
| WO | 2007/053106 A1 | 5/2007 |
| WO | 2008021573 A2 | 2/2008 |
| WO | 2008052780 A1 | 5/2008 |

OTHER PUBLICATIONS

Philips; "Control of CQI feedback signalling in E-UTRA"; 3GPP TSG RAN WG1 Meeting #48; Tdoc R1-071093; Feb. 12-16, 2007; pp. 1-3; St. Louis, MO.

LG Electronics; "Channel Quality Reporting for Downlink Transmissions"; 3GPP TSG-RAN WG2 #60; R2-074966; Nov. 5-9, 2007; Jeju, Korea.

Huawei; "fast CQI report in CELL_FACH state"; 3GPP TSG-RAN WG2 #60bis; R2-080109; Jan. 14-18, 2008; pp. 1-3; Sevilla, Spain.

PCT International Search Report in corresponding International Application No. PCT/SE2008/051383, dated Mar. 20, 2009.

PCT Written Opinion of the International Searching Authority in corresponding International Application No. PCT/SE2008/051383, dated Mar. 20, 2009.

Jeon, S-Y et al., "An Enhanced Channel-Quality Indication (CQI) Reporting Scheme for HSDPA Systems" IEEE Communications Letters, IEEE Service Center, Piscataway, NJ, US, vol. 9, No. 5, May 1, 2005, pp. 432-434, XP001229726; ISSN: 1089-7798.

3GPP Technical Specification TS 25.214, V8.3.0, Technical Specification Group Radio Access Network, Physical Layer Procedures (FDD), Release 8, Sep. 2008.

3GPP Technical Specification TS 25.101, V8.4.0, Technical Specification Group Radio Access Network; User Equipment (UE) Radio Transmission and Reception (FDD), Release 8, Sep. 2008.

International Preliminary Report on Patentability dated Dec. 4, 2009 in connection with International Application No. PCT/SE2008/051383 with annexes.

Extended European Search Report in related European Application No. 11181905.8 dated Jan. 12, 2012.

Search Report issued in corresponding Chinese Patent Application No. 200880123177.3, dated Sep. 23, 2012.

Chinese Office Action issued in corresponding Chinese Patent Application No. 200880123177.3, dated Oct. 11, 2012.

Japanese Office Action in corresponding Japanese Application No. 2010-539373 dated Feb. 12, 2013.

Canadian Office Action in corresponding Canadian Application No. 2,710,158 dated May 4, 2015.

Extended European Search Report in corresponding European Application No. 17 194 282.4 completed Dec. 15, 2017. (All references not cited herewith have been previously made of record.).

3GPP TS 25.306 V7.5.0, "3rd Generation Partnership Project; Technical Specification Group Radio Access Network; UE Radio Access capabilities" (Release 7), Sep. 2007, pp. 1-48.

3GPP TSG-RAN WG4 (Radio) Meeting #44, "Response LS on Receiver Performance and Enhanced CELL_FACH state," R4-071486 Athens, Greece, Aug. 20-24, 2020, 1 page.

* cited by examiner

METHOD APPARATUS AND NETWORK NODE FOR APPLYING CONDITIONAL CQI REPORTING

CROSS-REFERENCE TO RELATED APPLICATIONS

This application is a continuation of U.S. patent application Ser. No. 14/065,740, filed on Oct. 29, 2013, which is a continuation of U.S. patent application Ser. No. 13/287,501, filed on Nov. 2, 2011, now U.S. Pat. No. 8,599,816 which issued on Dec. 3, 2013, which is a continuation of U.S. patent application Ser. No. 12/337,298, filed Dec. 17, 2008, now U.S. Pat. No. 8,149,809 which issued on Apr. 3, 2012, which is a continuation of International Application No. PCT/SE2008/051383, filed on Dec. 1, 2008, which is related to, and claims priority from, U.S. Provisional Patent Application No. 61/016,081, filed on Dec. 21, 2007, the disclosure of all of these applications being expressly incorporated here by reference.

TECHNICAL FIELD

The present invention relates generally to a method and arrangement for limiting the CQI reporting in a telecommunication system, and in particular to provide conditional CQI reporting also in enhanced CELL_FACH state.

BACKGROUND

High Speed Downlink Packet (HSDPA) is a further development of WCDMA, enabling considerably higher bit rates in the downlink. In order for the network to achieve these improvements, some indication of the present channel quality has to be provided to the network. On the basis of this information, appropriate preparations can be performed at the network in order to provide for the required data transfer in the downlink. For this purpose Channel Quality Indicators (CQIs) are used. The aim of forwarding a CQI from a User Equipment (UE) to the network is to use the information obtained from the CQI, and to allow the network to perform various tasks, such as e.g. channel dependent scheduling, link adaptation and downlink power allocation, on the basis of the retrieved information.

In WCDMA the RRC states IDLE, CELL_PCH, URA_PCH, CELL_FACH and CELL_DCH are used. FIG. 1 is a schematic illustration of a typical scenario for CQI forwarding involving a UE 100 and a base station 101 which are involved in an information exchange.

In a first step 1:1 base station 101 transmits reference signals to UE 100. The reference signals are used by UE 100 to determine the present downlink channel quality. After having determined the downlink channel quality on the basis of the received reference signals, UE 100 sends one or more CQIs to the base station 101, as indicated with a second step 1:2. The base station 101 uses the content of the CQI reports for performing tasks, such as e.g. link adaptation, resource allocation, power control, and scheduling. After an adequate processing of the obtained information at the base station 101, UE 100 is informed of the result of the performed task, e.g. the resulting link adaptation, in a next step 1:3, and subsequent to the respective preparations, downlink transmission is executed via the allocated resources, as indicated with a final step 1:4.

In CELL_DCH state downlink data transmissions and resource allocation are performed via HS-PDSCH and HS-SCCH channels. In HSDPA, which is a release 5 feature, the uplink in CELL_DCH state HS-DPCCH is used for carrying CQI and ACK/NACK to the network.

A reported CQI normally depicts downlink channel quality corresponding to a certain transport block size when using a certain modulation and coding that could be received by a UE with 10% block error rate. This type of mapping between CQI and transport block sizes for WCDMA is defined in 3GPP technical specification 25.214. Thus, a CQI reported from a UE to the network enables the network to select an appropriate Transport Block (TB) size for upcoming transmissions. Thanks to the CQIs, the downlink transmission rate therefore can be optimized and enhanced.

The TBs may range between [1,31], with a resolution of 1 dB, where a TB size that equals 1 is the smallest size and a TB size that equals 31 is the largest size that can be used for downlink transmissions. However at present the largest TB size used is 30, while a TB of size 31 may be used in the future. Mapping of a reported CQI to TB size for different modulation and coding scheme is specified in further detail in the 3GPP standard TS 25.214.

CQI reporting is typically executed in a periodic manner, which is also referred to as the CQI feedback cycle, where the reporting can be adjusted by the network through higher layer signaling. The CQI feedback cycle is expressed in Transmission Time Intervals (TTIs). At present the possible CQI feedback cycle values are 0, 2, 4, 8, 10, 20, 40, 80 and 160 TTIs. When uplink discontinuous transmission is used it is possible to temporarily switch off CQI reporting in order to reduce the uplink interference.

In release 5 the UE receiver performance requirements are solely based on the baseline classical rake receiver of the UE. The corresponding performance requirements are commonly termed and specified as minimum performance requirements in the 3GPP technical specification TS 25.101.

Also in release 6 and beyond the enhanced UE receiver performance requirements have been specified. In order to fulfill these requirements and to pass the corresponding conformance tests, the UE will have to implement advanced receiver features, such as e.g. receiver diversity, a chip level equalizer and/or a generalized rake (G-rake) receiver. Evidently the goal of the specification of these enhanced requirements is to significantly boost the downlink bit rate.

In WCDMA terminology UE receiver performance requirements for various advanced receivers have, until now, been specified as enhanced receiver type 1, type 2, type 3 and type 3i. However, the enhancement receiver performance specification does not preclude the UE vendors to implement advance receivers beyond the specified enhanced requirements.

As of today a HSDPA capable UE normally reports its category in terms of e.g. a maximum number of codes, or bits, in one TTI when this information is forwarded to the network. However, the UE does not report any of its enhanced receiver capabilities, such as e.g. the enhanced receiver type. As a consequence, the network is completely oblivious of the type of enhanced receiver that is implemented at the UE. In order to obtain optimum performance it is, however, of paramount importance that different functions, such as e.g. the scheduler, at the base station are able to fully make use of the enhanced UE receiver capabilities. A UE having an advanced receiver will obtain a better estimation of the downlink Signal-to-Interference and Noise Ratio (SINR) estimation, compared to if a baseline rake receiver is used.

The CQI is fundamentally derived from the SINR, which in turn is estimated on the basis of the Common Pilot Channel (CPICH). Hence the reported CQI implicitly depicts the actual receiver performance. This means that a UE equipped with a more advanced receiver will be able to report relatively high CQIs, which in turn will allow the network to schedule a higher data rate to the UE, and, thus, a higher performance will be obtained from the UE.

In release 7 a new feature, often referred to as enhanced CELL_FACH state, have been introduced. This feature allows mapping of generally low bit rate data, such as e.g. paging or small packets, in low RRC activity states, such as e.g. the IDLE mode, CELL_PCH, URA_PCH or CELL_FACH state, on to a HS-DSCH transport channel. The main advantage with such a feature is that in any of these low activity states the paging or data can be swiftly transmitted to the UE. This is because the scheduling on HS-DSCH is done at the base station and the HS-DSCH is shared between multiple UEs on a TTI basis, which typically has a periodicity of 2 ms.

In addition, according to the state of the art technology, transmission between a UE and the network in enhanced CELL_FACH state is characterized by the fact that a UE receives the scheduling information via HS-SCCH, i.e. in a same manner as in the CELL_DCH state. However, in enhanced CELL_FACH state there is no HS-DPCCH channel available for a UE to report a CQI or ACK/NACK, and, thus, no link adaptation or channel dependent scheduling will be possible in this state. Furthermore, the network blindly transmits a fixed number of HARQ transmissions, i.e. a first transmission and, whenever necessary, up to a specified number of retransmissions. HARQ combining is, however, possible at the UE.

In release 7 and beyond, however, use of the High Speed Downlink Shared Channel (HS-DSCH) is possible also in any of the low activity RRC states, i.e. in idle mode, URA_PCH, CELL_PCH and CELL_FACH states. This option allows a mapping of PCH and FACH transport channels to the shared channel, i.e. the HS-DSCH. However, in order to minimize the uplink load, a UE that is in any of these states is not allowed to report any CQIs to the network.

Further improvements have been specified in release 8 in which CELL_FACH in the uplink has been improved by enabling E-DCH activation where, for example, the base station controls resources for common E-DCH and the required downlink control channels, i.e. Fractional Dedicated Channel (F-DPCH), E-DCH HARQ Acknowledgement Indicator Channel (E-HICH) and E-DCH Absolute Grant Channel (E-AGCH). Common E-DCH configurations are broadcasted on BCCH, which can transmit short packets using E-DCH. However, unlike in CELL_DCH, the E-DCH establishment phase in enhanced CELL_FACH is much shorter, which results in a faster call setup, a faster packet transmission and in a reduced overall latency.

As already noted above, CQI reporting is currently not done in enhanced CELL_FACH state. This means that the network can neither perform channel dependent scheduling, nor link adaptation, such as using an adaptive modulation or coding scheme when it is in this state. Furthermore, downlink power control on HS-PDSCH, or on any other downlink physical channel, cannot be accurately executed in this state due to the lack of CQI reporting.

Another major repercussion from the lack of CQI reporting in the enhanced CELL_FACH state is that there is no motivation for network operators to specify enhanced receiver requirements. As a matter of fact, up to date only minimum performance requirements for enhanced CELL_FACH scenario have been specified.

It is important to note that advanced receiver performance requirements are specified for each physical channel separately. On the one hand, the implementation of an advanced receiver boosts user throughput, but on the other hand it also increases cost and UE battery power consumption. Therefore, advanced receivers will work strictly on those channels for which performance requirements exist. This means that the enhanced receiver requirements for HSDPA in the CELL_DCH state fail to imply that enhanced receivers are also implemented for HSDPA reception in the enhanced CELL_FACH state.

As indicated above, the main problem with the current enhanced CELL_FACH state feature is that downlink scheduling is done without any knowledge of the downlink radio conditions, due to the lack of CQI reports. This means that channel dependent scheduling and link adaptation is not possible, and thus as a result from this deficiency the throughput performance will be significantly poor. Using a fixed number of HARQ re-transmissions, e.g. 3 or 4, without taking any regard to the present radio conditions lead to wastage of radio resources. In fact the main bottleneck with this approach is that presently there is no reason or motivation for any UE vendor to implement an advanced receiver for data reception in the enhanced CELL_FACH state. Any sort of CQI reporting would, however, motivate the implementation of advanced receivers at the UE.

One obvious and straight forward solution to the deficiencies mentioned above is to follow the conventional path by defining a normal CQI reporting scheme as is presently done in the CELL_DCH state also for the enhanced CELL_FACH state. A primary concern with this approach is, however, that in enhanced CELL_FACH state, where no UE specific channel is in operation, the conventional CQI reporting scheme may lead to unsustainable load on the RACH channel, which is presently the only uplink transmission mode in enhanced CELL_FACH state, as specified in release 7. In addition, the CQI reports are not really needed as frequently in the enhanced CELL_FACH state as in the CELL_DCH reception scenario.

In the Swedish patent application 0602299-0 it is proposed that a CQI threshold, that can be either cell- or UE specific, is transmitted from the network to a number of UEs, and that each UE whose CQI is below the CQI threshold needs to report a new CQI to the network. One deficiency with this solution is that even for a dynamic forwarding CQI mechanism, the probing and decision making of a forwarding of a new CQI by the network to a UE will result in a delay. Secondly if radio conditions change quickly, several UE's may rapidly move between good and bad conditions, with the severe risk that many users will start to report the CQI more frequently, thereby increasing the uplink load.

It is therefore a desire to enable a regulated CQI reporting that does not have a negative effect on the uplink load.

SUMMARY

An object of the present invention is to address at least some of the problems outlined above. More specifically, it is an object of the present invention to provide a method for, and a User Equipment and a network node that are adapted to execute a method for allowing limited CQI reporting between a User Equipment and a network node also when the User Equipment is in low transmission and/or low reception activity mode.

According to one aspect, a method for limiting Channel Quality Indicator (CQI) reporting from a User Equipment to a network node, such as e.g. a base station, is provided. The method is specified such that at least one CQI report may be transmitted to the network node when it has been determined that the User Equipment is operating in a low transmission and/or low reception activity mode. CQI reporting is being triggered at the User Equipment according to one or more predefined rules, which to at least some extent depend on CQI specific information that is provided from the network node.

The triggering rules that specifies when a CQI report is to be sent from a User equipment to a network node may be based on one or more of a plurality of different criteria such as e.g. a comparison between the transport block size corresponding to an estimated CQI and a transport block size received by the User Equipment, a comparison between an estimated CQI and a predefined threshold, a comparison between an estimated CQI and the number of required re-transmissions for a transport block received by the User Equipment, a CQI reporting probability provided to the User Equipment from said network node, and/or a scaled CQI feedback cycle at least partly determined by the network node.

The triggering rules may be based on one single criteria or a combination of different criteria.

The suggested CQI reporting may be executed via different means of communication such as e.g. via RACH or E-DCH. In addition, transmission could be executed via the Radio Resource Layer or via the Medium Access Layer.

According to another aspect, a User Equipment, adapted to report CQI reports to a network node, when the User Equipment is in a low transmission and/or low reception activity mode, in accordance with the rules specified for the User Equipment and triggering information provided from the network node, is also provided.

In addition, according to yet another aspect, a network node is provided that is adapted to control the triggering of CQI reports at User Equipments that are in low transmission and/or low reception activity mode, by way of forwarding trigger related information to User Equipments.

The suggested option allows an efficient way of reporting CQI reports in low activity modes.

In some embodiments, wherein CQI reporting is performed on a common channel, e.g. RACH, the invention has the additional advantage of minimizing collisions on the channel used.

By implementing the suggested mechanism channel dependent scheduling, downlink power control and link adaptation can be more efficiently performed in low activity modes.

In addition, the suggested mechanism also provides a motivation to the UE vendors to implement advanced receiver at the UE, since information obtained via CQIs may assist the network to improve overall performance in low activity modes.

According to some embodiments, wherein CQI reporting is limited in enhanced CELL_FACH state, another consequence from introducing the suggested mechanism is that is may ensure that HSPDA performance in enhanced CELL_FACH does not lag behind the corresponding performance in CELL_DCH, in which advanced receivers are already used in the UE.

Other objects, advantages and novel features of the invention will become apparent from the following detailed description of the invention when considered in conjunction with the accompanying drawings. These objects and others can be achieved primarily by a solution according to the appended independent claims.

Further features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Figure 1:
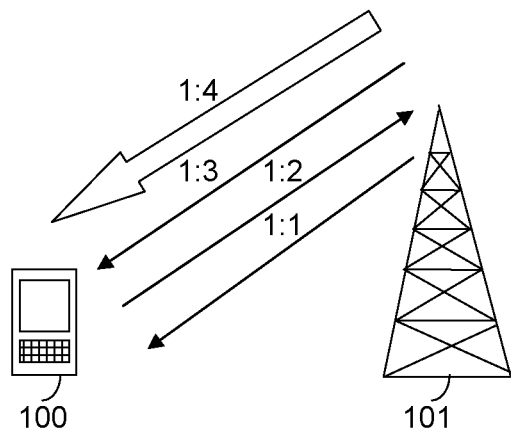
FIG. 1 is a basic overview of a conventional scheduling concept, according to the prior art.

In order to ensure that a particular advanced receiver is implemented to UEs, the corresponding enhanced receiver performance requirements should be further specified. Such a step can, however, only be motivated if the UE is capable of reporting CQIs also in the enhanced CELL_FACH state. In order to obtain that added cost and increase in UE power consumption will most likely have to be traded with enhanced end user performance i.e. with a higher user throughput.

In Enhanced CELL_FACH state, CQI reporting between a UE and the network will typically involve RACH transmissions. High uplink transmission load due to frequent CQI transmission may however lead to collisions on the RACH. The network may also have limited resources available for HSDPA transmissions and for processing received CQIs when in enhanced CELL_FACH state. As a consequence, a high frequency of CQI reports may not result in any system benefit and, thus, a mechanism adapted to limit the transmissions of CQI reports from UEs to the network in the enhanced CELL-FACH state whenever deemed necessary is therefore required.

It should be noted that, although the problems mentioned above are more significant in the CELL_FACH state, reducing the uplink transmission load is beneficial regardless of the state the UE is in. The invention could especially be used in any other state or operation mode where it is important to reduce uplink transmission overhead. This is particularly needed when there is low UE transmission and/or reception activity. Some examples are when the UE operates in discontinuous reception (DRX) and/or in discontinuous transmission (DTX) modes regardless of the RRC states. In these modes of operation either the UE has less opportunity for measuring CQI or reporting CQI or for both measuring and reporting. In WCDMA DRX/DTX is used in CELL FACH as well as in CELL DCH states. This means the invention is equally applicable in CELL DCH state in WCDMA especially in DRX/DTX modes. Similarly in E-UTRAN DRX/DTX is used in RRC connected state, where the invention is applicable to achieve CQI overhead reduction.

It is therefore an objective to provide a CQI delivery mechanism that is based on rules for governing CQI reporting in low activity mode that allows the uplink transmission load to remain within reasonable limits, while in the same time ensuring an optimum usage of the available radio resources. A UE may be configured to report a CQI both when transiting between different RRC states, as well as during the same RRC state, according to one or more of a number of different principles which will be described in more detail below. These principles will be based on one or more predefined rules, each of which may be applied alone or in a combination. The general principle of such a mechanism will now be described in accordance with the flow chart of FIG. 2, which is an illustration of a CQI reporting method, to be executed in a UE, and the flow chart of FIG. 3, which is an illustration of corresponding method steps to be executed by a node of the network side, typically a base station, that is connected to the UE.

Figure 2:
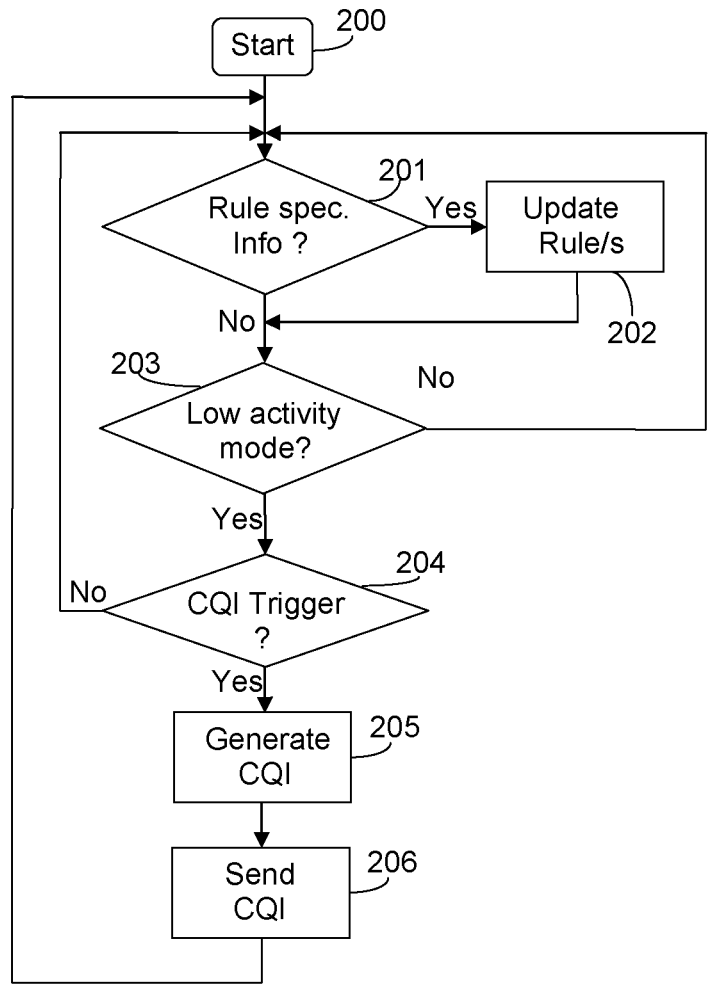
FIG. 2 is a flow chart, illustrating a method of a User Equipment for enabling limited CQI reporting to a network node from the User Equipment when in a low activity mode, according to one embodiment.

According to FIG. 2, a UE is configured in a first step 200. In a typical scenario, CQI reporting will be managed according to a set of pre-configured CQI triggering rules. Alternatively, the UE is provided with a standard set of rules from the network upon UE activation, or at the start of a call set-up.

In a next step 201 it is determined whether any of the CQI triggering rules or conditions is to be updated, i.e. if any CQI triggering rule specific information has been received from the network. If this is the case, the relevant rule is updated, as indicated with another step 202. In another step 203 it is determined whether the UE is operating in a low activity mode, i.e. a low transmission and/or low reception activity mode or not. As mentioned above, this is the case for instance if the UE is in DRX/DTX mode, or if it is in the enhanced CELL_FACH state. If in a low activity mode, the initiated procedure is continued in another step 204 by determining whether a CQI trigger has been activated on the basis of the present rules. If more that one CQI trigger is required for initiating the transmission of a CQI to the network node, step 204 may be repeated by an additional step, wherein also this condition is tested. If it is determined that one or more specified CQI trigger conditions are fulfilled, a CQI report will be generated, as indicated with a next step 205. The CQI report is then sent to the network using a specified transmission mechanism, as indicated with a subsequent step 206. The described updating and CQI triggering procedure is then continuously repeated, as indicated in the flow chart, as long as the UE remains activated or during the present call, all dependent on the present configuration.

The corresponding procedure for maintaining the rules of each activated UE updated on a node on the network side will now be schematically described with reference to the flow chart of FIG. 3. The described method is typically run on a base station in association with executing a suitable scheduling algorithm and link adaptation, or any other type of algorithm, such as e.g. power control, which may require CQI information.

Figure 3:
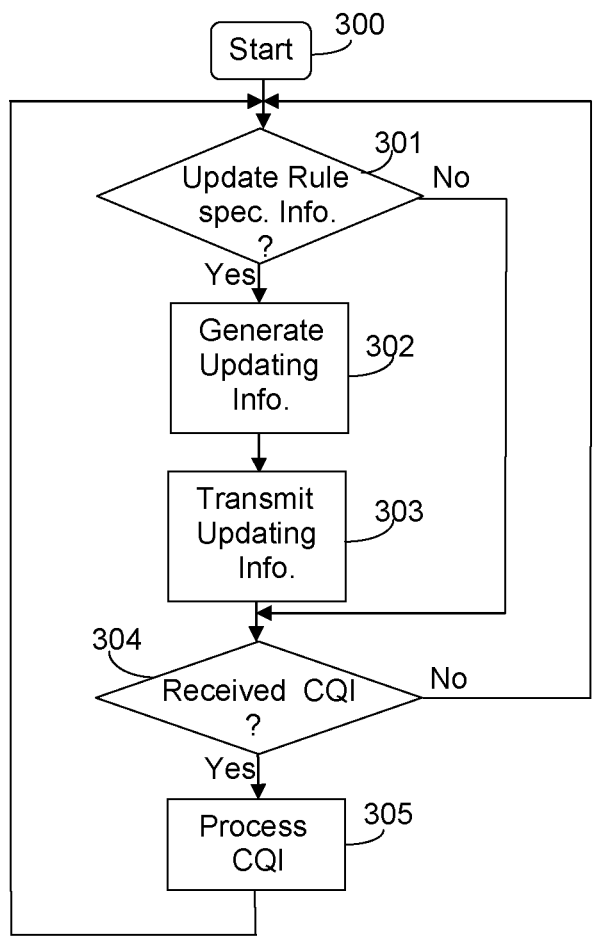
FIG. 3 is a flow chart, illustrating a method of a network node for enabling limited CQI reporting from a User Equipment to the network node, according to one embodiment.

In a first step 300 of FIG. 3, a procedure for keeping the conditions for CQI triggering at activated UEs updated is started. In a next step 301 it is determined if an updating of any rule associated with the CQI triggering of a specific UE is required. If it is determined that such an updating procedure is required, relevant information is generated or computed, all according to predefined CQI triggering rules, as indicated with a step 302, and in a subsequent step 303, the information is transmitted to the relevant one or more UEs. In a next step 304 it is determined whether a CQI is received, and if so the content of the CQI is retrieved and processed in a step 305, before the described procedure is repeated.

The CQI triggering rules for a UE may be based on a number of different criteria, such as e.g. a comparison rule.

According to one aspect, the transport block size presently received by a UE may be compared to a transport block size corresponding to an estimated CQI.

According to another aspect, an estimated CQI may instead be compared to a predefined threshold, while according to a third aspect an estimated CQI may instead be compared to the number of required re-transmissions for a received transport block.

According to yet another aspect, the CQI triggering may instead rely on a probability based rule, where a CQI is to be reported from a UE according to probability measures that has previously been signaled to the UE from the network. Alternatively, a dynamically scaled CQI feedback cycle may be used for determining when to send a CQI from the UE.

Alternatively, a transmission of a CQI from a UE may be triggered by a rule which is based on a combination of two different principles, such as e.g. a combination of a probability based rule and a comparison based rule, which takes the transport block size into consideration, or as an alternative from two or more different principles.

A number of different CQI triggering rules that are based on the principles mentioned above will now be described in more detail.

According to yet another of the alternative embodiments suggested above, CQI reporting may instead be based on a comparison rule where a measured or predefined value, such as e.g. a CQI value, corresponding to a determined transport block size, or a predefined threshold, is compared to an estimated CQI. When applying a comparison rule a CQI may be measured by a UE over a transmission time interval (TTI), as done in CELL_DCH.

Alternatively, the CQI triggering rule may instead be based on an average value whose estimation is based on the number of re-transmitted transport blocks that has been identified by the network node, e.g. the base station. In this scenario the base station identifies the number of required re-transmissions and estimates a CQI threshold based e.g. on the average transport block size of the retransmitted blocks and signals the threshold to the UE. Such a rule will typically be applicable for situations when the respective UE is receiving data. Another possibility is to instead base the triggering rule on simple time averaging, where an average time is sent from the network node to the UE, and where the UE is measuring a CQI over the given average time.

According to yet another alternative embodiment, another rule may specify that a CQI is to be reported from the UE provided that a transport block has been incorrectly decoded at the UE after a specified number of re-transmissions have occurred. This is typically a result of the fact that a transmitted transport block size is much larger than what the UE can actually handle, due to that the presently estimated CQI corresponds to a transport block size that is smaller than required. As a result, the network node will be able to adjust the transport block size accordingly, on the basis of a reported CQI.

Accordingly, the CQI triggering rules may specify that a CQI is to be reported, provided that the transport block size corresponding to an estimated CQI is significantly larger than the received transport block size. A threshold in terms of a difference between an estimated transport block size and a received transport block size can be used to minimize the uplink overheads and to improve the downlink resource utilization and handling of downlink resource allocations at the network.

Figure 4:
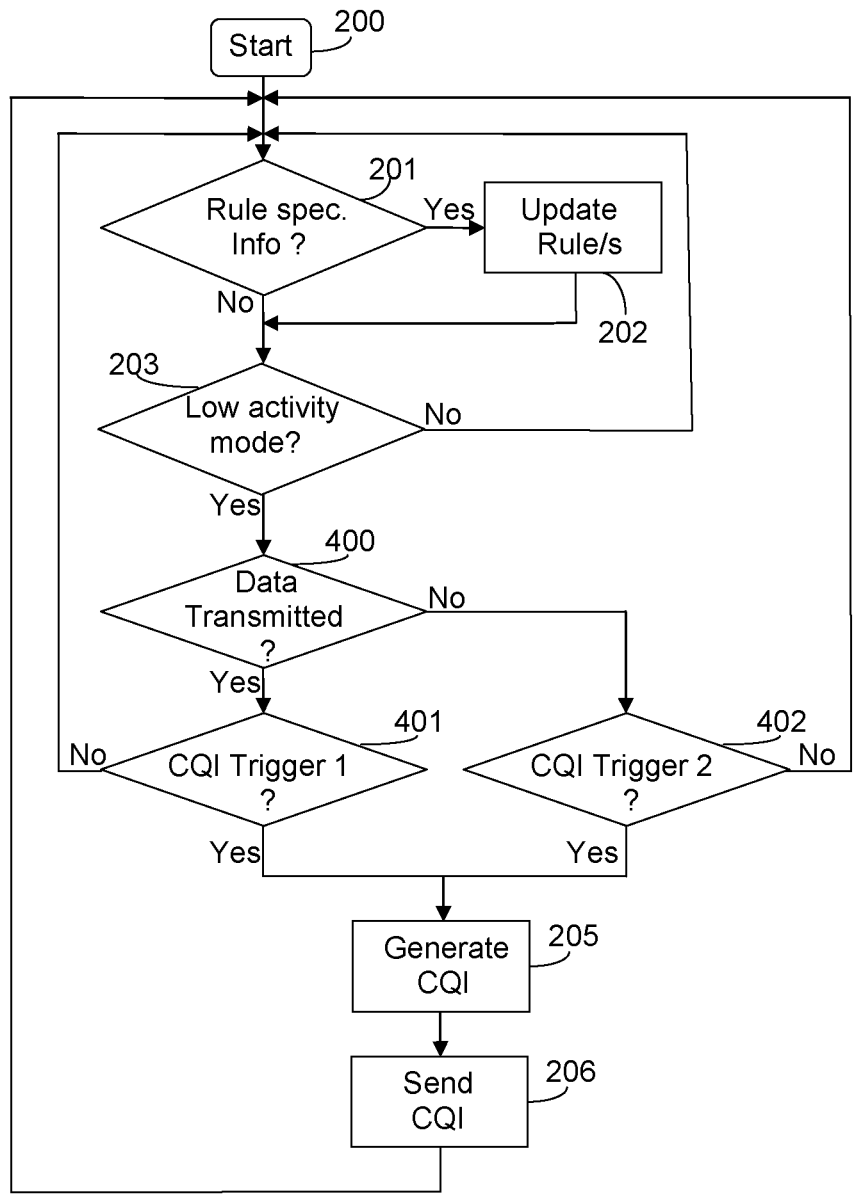
FIG. 4 is another flow chart, illustrating a method of a User Equipment for enabling limited CQI reporting to a network node from the User Equipment when in a low activity mode, according to another alternative embodiment.

Yet another possibility of executing a comparison based CQI triggering rule at the UE may be achieved by specifying that the UE is reporting a CQI if it is found in step 204 of FIG. 2 that a received transport block has been decoded within J–K (K<J) transmission attempts, where J is the maximum number of re-transmissions and K is a predefined value. Thus, if a received block is decoded in a first or very few transmissions, this will be an indication that the transport block size should be changed, and the UE will be triggered to report a new CQI to the network node, in order to provide input data for such a change. Hence, the rules described in this embodiment correspond to the situation where a UE may be able to handle much larger transmitted blocks than the transport block size that is currently being transmitted. Such an alternative CQI triggering configuration is illustrated with FIG. 4, where step 204 of FIG. 2 comprises steps 400-402 and c. In step 400 it is determined whether data is being transmitted between the UE and the network or not. If this is the case, a first QCI trigger condition is evaluated in a subsequent step 401, while another CQI trigger condition is instead evaluated, as indicated with subsequent step 402, in case it is determined that no data is presently transmitted. If the evaluated CQI trigger condition is fulfilled, the procedure of FIG. 2 is continued by generating a CQI, as indicated in step 205.

According to yet another embodiment, the CQI reporting mode may be based on different rules, depending on whether the UE is engaged in data transmission or not. If data is transmitted in enhanced CELL_FACH, the CQI reporting may be based on a comparison between a transport block size that corresponds to an estimated CQI and a transmitted transport block size, as suggested above. If, however, there is no data sent in enhanced CELL_FACH, the CQI reporting may instead be based on a comparison between the transport block size corresponding to the estimated CQI and a predefined threshold. From the network perspective, such a dynamic CQI triggering mechanism, will provide information about how many UEs that are presently in bad coverage. A CQI threshold may be broadcasted to a plurality of UEs, or sent directly to a dedicated UE.

According to another embodiment, a probability based CQI reporting rule may be applied for a UE in a low activity mode, wherein in step 204 of FIG. 2 a CQI report is triggered according to a probability that has been determined at a network node, and forwarded to the UE, typically by way of broadcasting. In response to receiving updated probability information, the respective rules are updated in step 202, accordingly.

In some embodiments, the probability based CQI reporting rule is applied when the User Equipment is in CELL_FACH state. The CQI reporting probability may be defined as a single parameter per cell, i.e. as a parameter which is available for all enhanced CELL_FACH states. Another possibility is to instead specify a separate CQI reporting probability value for each enhanced CELL_FACH state in the form of a probability vector. Since paging of transmission generally occurs less frequently than data transmission on CELL_FACH, a higher probability may be specified in CELL_FACH than in CELL_PCH. A typical CQI reporting probability vector may comprise M probabilities, corresponding to M available activity states, where $P_i$ is the probability for state i, while satisfying the following condition:

$$\sum_{i=1}^{M} P_i = 1 \qquad (1)$$

Alternatively, a CQI reporting probability provided to a UE could be limited only to one state in which a possibility for CQI reporting is desired. In such a case only a single value, rather than a vector, is transmitted from the network to the UE.

According to yet another alternative rule, the CQI reporting probability is instead configured to be UE specific for a particular cell, i.e. $\rho_i$ is applicable only for user i while fulfilling the following constraints for N enhanced CELL_FACH users per cell:

$$\sum_{i=1}^{N} \rho_i = 1 \qquad (2)$$

According to yet another embodiment, the CQI reporting probability is instead both UE and state specific.

Once a CQI reporting probability has been transmitted by the network and received by a UE, the UE adapted to operate according to this probability will typically do one or more random trails before the CQI report is generated and transmitted to the network node. If, for instance, this parameter is 0.5 the UE will statistically send a CQI, on a suitable channel, on every second possible transmission occasion. The CQI may e.g. be transmitted via E-DCH if the UE is transmitting data, and, thus, the E-DCH is already used.

Alternatively the CQI may be transmitted via the High Speed Dedicated Physical Control Channel (HS-DPCCH), which is usually used for CQI transmission, in association with HSDPA. If transmitted via HS-DPCCH, the CQI can only be transmitted when there is uplink transmission on E-DCH. Hence, another option is to transmit the CQI via RACH, which can be used regardless of whether E-DCH or HSDPA is transmitted or not. Thus if CQI is transmitted via RACH for CQI transmission, the CQI transmission time resolution, specifying the transmission instance, will be at least equivalent to a RACH transmission time slot. In a typical scenario this transmission frequency will be higher than necessary, and, thus, the transmission instance for CQI transmissions could be chosen to be much longer without being penalized with any capacity loss.

One possible way of limiting the transmission frequency is to signal a periodic time interval, together with the probability, from the network. In such a case, the transmission of a CQI, specified according to the given probability, will be delayed the specified time interval.

Another alternative solution is to link the periodic time interval with the DRX cycle used by the UE in any of the CELL_PCH, URA_PCH or CELL_FACH states.

The CQI reporting probability should achieve at least the objectives of minimizing the amount of uplink collisions on RACH by way of limiting the uplink load and of ensuring that an adequate amount of CQI reports are regularly delivered from the UE to the network.

When generating CQI reporting probability at the network, as indicated in step 302 of FIG. 3, one or more factors may be considered in order to strive towards fulfilling the objectives mentioned above. These factors may include e.g. the current load on RACH, the number of users in a cell on a particular state belonging to enhanced CELL_FACH, or on all states belonging to enhanced CELL_FACH, the amount of data buffered for users in CELL_FACH state, and/or the present user's service type.

In a situation where the current load on RACH is considered together with the number of active enhanced CELL_FACH users when deriving a CQI reporting probability at the network node, a low uplink RACH load and few active users may typically result in a high probability, and vice versa.

Since the CQI reporting probability is dependent on the network load, which typically varies over time, it needs to be updated as the load changes. In addition, some margin could typically be added to the CQI reporting probability so that it does not have to be updated in case of small variations in the load.

According to another alternative aspect, the CQI reporting probability is instead signaled from the network to the UE on a BCH channel using only one system information element per cell. In such a scenario a UE will initially acquire probability information when it first reads the received system information, i.e. step 202 is executed when system information is received from the network. In existing network systems the UE reads the BCH channel also when system information has been changed, and the change is indicated to the UE via the paging channel. Thus, whenever a CQI reporting probability changes, the UE will easily be able to acquire the latest value to be used for subsequent CQI transmissions from the BCH channel.

According to yet another alternative aspect the CQI reporting probability could also be sent to the UE on the user specific channel e.g. on the dedicated control channel, which is mapped on HS-DSCH channel, whenever possible, under the present circumstances. For instance, in CELL_FACH state the CQI reporting probability may be sent over the control signaling, which is multiplexed with the transmitted data, since the control signaling, e.g. the RRC signaling, is already multiplexed with data on HS-DSCH. This type of signaling mechanism may be especially useful if a user specific CQI reporting probability mechanism is employed, since it reduces signaling overheads. This is due to the fact that since transmitting a user specific parameter, i.e. a user specific CQI reporting probability, using any other transmission means, such as e.g. BCH, would lead to a lot of load on BCH. BCH should contain information, which is required by all or a large number of UEs.

RACH is basically used to access resources for call set-up, or for providing transmissions of short packets. When a collision has occurred at a UE the UE is allowed to try to re-transmit on the RACH after a random time, determined by a back off algorithm used by the UE, has elapsed. During such a back off time the UE should also not transmit any CQI on the RACH. However, CQI reporting on E-DCH in enhanced CELL_FACH can still take place, provided that the corresponding resources for E-DCH have already been assigned to the UE.

According to another embodiment, the CQI reporting is instead based on a scaled CQI feedback cycle. If a scaled CQI feedback cycle is applied as a CQI transmission rule, the UE is instead configured to derive a dynamic CQI feedback cycle from a basic CQI feedback cycle (T) and a scaling factor ($\mu$), which may be referred to as a dynamically scaled CQI feedback cycle. In this context the purpose of the scaling factor is to scale up, or scale down, the basic CQI feedback cycle depending upon one or more factors, such as e.g. the uplink load on the RACH and/or the number of users that are presently in enhanced CELL_FACH state.

The basic CQI feedback cycle (T) is a parameter which is similar to the one signaled from the network to the UE in any state of the art system in CELL_DCH. When used in the enhanced CELL_FACH state, however, the basic CQI feedback cycle may also be dynamically scaled, e.g. according to the load. Secondly, as will be further explained below, a derived dynamically scaled CQI feedback cycle may be randomly distributed in order to minimize the risk of collisions, due to multiple users sending CQIs simultaneously.

Both the basic CQI feedback cycle and the scaling factor can be a respective single value which is common for all states that are related to enhanced CELL_FACH in a cell, or they can be state specific values. A dynamically scaled CQI feedback cycle ($\Psi$) that is applicable for enhanced CELL_FACH state can be mathematically expressed as:

$$\Psi = f(T, \mu) \quad (3)$$

More specifically the dynamically scaled CQI feedback cycle may be obtained at the UE by performing a suitable mathematical operation over the basic CQI feedback cycle, e.g. by multiplying it by the scaling factor as expressed in:

$$\Psi = T \times \mu \quad (4)$$

In such a case step 302 of FIG. 3 may have been configured such that both the basic CQI feedback cycle, as well as the scaling factor, is updated, before this updated information is broadcasted to the UE, together with the other system information, as indicated in step 303.

Alternatively, the basic CQI feedback cycle could be linked to the already used DRX cycles. In that case only the scaling factor is to be updated and signaled from the network node to the UE. Thus, due to the variation in the load on the RACH it might be sufficient to only adjust the scaling factor on the network side.

In a typical scenario, the basic CQI feedback cycle may be defined as $2^L$ and the scaling factors may be expressed as $2^P$; where P is an integer value, which may range e.g. between −4 and 4. According to this example, the network will be broadcasting L and P to the UE. Supposing that the basic CQI period is 32 ms, i.e. L=−5, and assuming the multiplication rule according to (4), we obtain the following. For P=2 the derived CQI feedback cycle will be 128 ms, which is a scaling down of the basic CQI reporting period, while if instead P=−1, the derived CQI period will be equal to 16 ms, which is a scaling up of the CQI feedback cycle, or an extension of the CQI feedback cycle.

As stated above, all users, as well as all states, in a cell may use the same CQI feedback cycle while the periodicity is scaled. Such a limited reporting of feedback information from the network to the UE advantageously will be minimizing the signaling in the downlink. However, it must also be taken into account that many users may attempt to report a CQI at the same time, which may cause collisions on the RACH. In order to ensure that two or more UEs do not transmit a CQI at the same time the rules governing the transmission instances may be defined to also take these aspects into consideration. One possibility is to have a rule that is specified such that the UE starts the first CQI transmission at a randomly determined time instance. This random parameter can be signaled to the UE from the network, together with the other rule specific information, or can be a standardized value that has been pre-configured for the UE.

According to another solution the random parameter could to some degree dependent on the CQI reporting period (Ψ). If, for instance, the CQI feedback cycle is set to 64 ms then the CQI trigger may have been specified such that each UE randomly chooses it's starting time of the CQI feedback cycle to a value between 0 and 64 ms. Since the CQI reporting is periodic, using such a mechanism would mean that also in subsequent transmissions, the overlapping between CQI reports originating from different UEs would be diminished. This in turn would minimize the risk of uplink collisions on RACH.

According to another alternative embodiment, the UE may instead have been configured to consider two subsequent triggers, i.e. a CQI is only transmitted by the UE if it has been considered that both a first CQI trigger condition and a second CQI trigger condition have been fulfilled. If such an embodiment is applied, step 204 of FIG. 2 may comprise steps 500 and 501 illustrated in FIG. 5.

Figure 5:
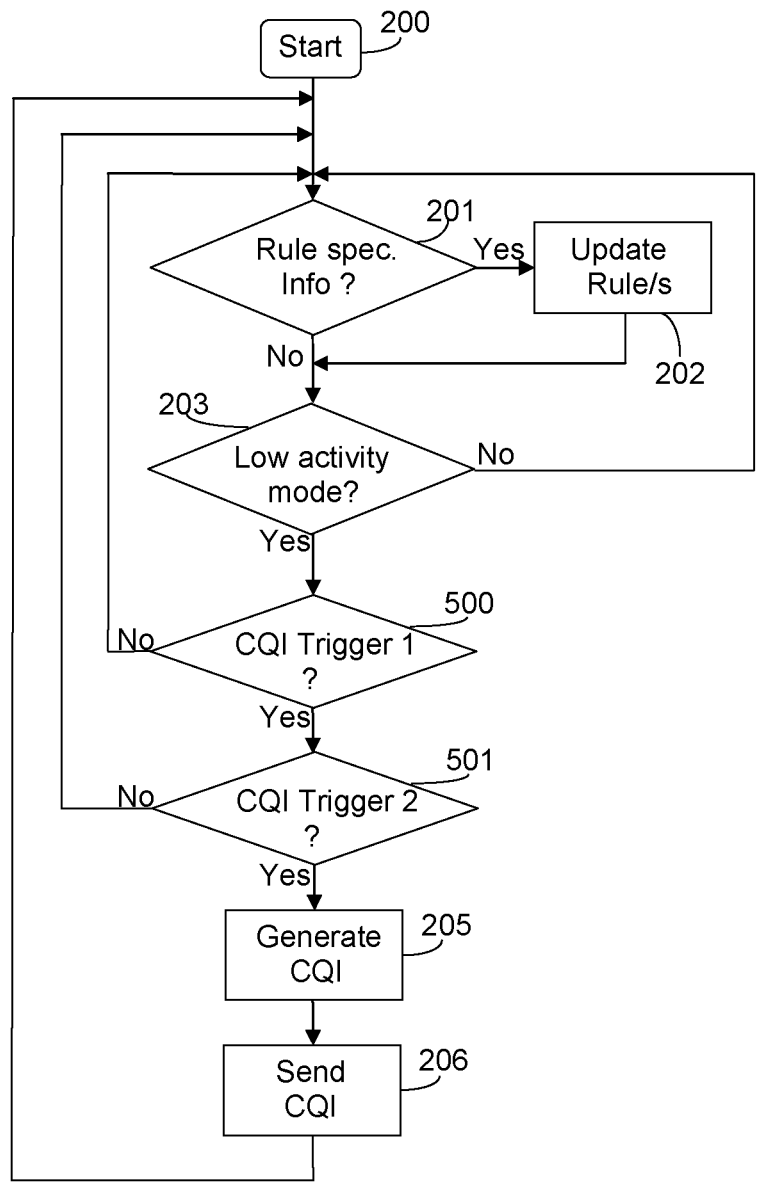
FIG. 5 is yet another flow chart, illustrating a method for enabling limited CQI reporting from a User Equipment to a network node, according to yet another embodiment.

According to FIG. 5, the UE first determines whether a first CQI trigger condition e.g. a transport block size comparison rule, has been fulfilled or not. This is indicated with a step 500. Even if the first comparison is fulfilled, a CQI will however only be generated and transmitted if it is determined in another step 501, that another rule, such as e.g. one of the probability rules defined above, also has been fulfilled.

By implementing a CQI triggering rule that is combined with a probability based rule, the overall signaling overhead will be limited, due to the limitation of the CQI reporting in a cell. If it is found that both conditions are fulfilled, the procedure of FIG. 2 is continued by generating a CQI, as indicated with step 205.

Alternatively, the UE may first apply a probability rule, and then use a transport block size comparison rule before a CQI is generated and transmitted to the network node.

Also this combined rule reduces the signaling overhead. In addition, the latter combination rule may also result in a reduced UE processing, since with the CQI reporting probability set to a low value by the network, the transport block size comparison rule will not have to be applied so frequently.

According to yet another embodiment, the UE initially checks whether CQI reporting is needed or not according to any of the described comparative methods, while a final decision is based on any of the scaled CQI rules defined above. A main advantage of using such a combined triggering rule is that the signaling overhead may be reduced even further, while the reported CQI would still be adequate to perform appropriate scheduling.

Figure 6:
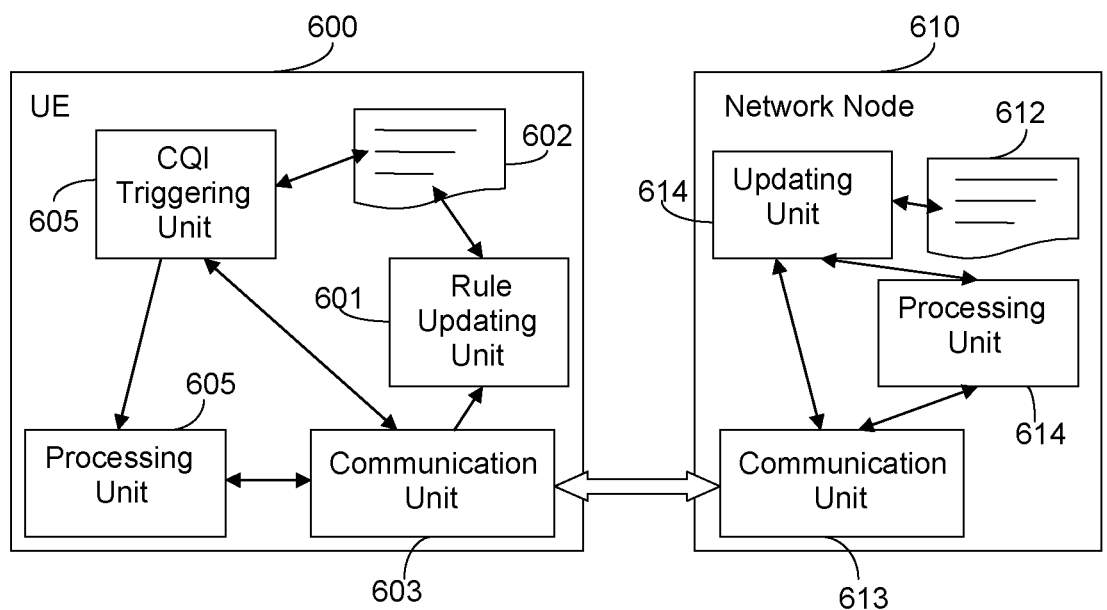
FIG. 6 is a block diagram of a User Equipment and a network node, according to one exemplary embodiment, which are adapted to execute a method according to any of the embodiments described with reference to any of FIG. 2, 4 or 5 and 3, respectively.

FIG. 6 is a schematic illustration of a UE 600 that is adapted to execute a conditional CQI transmission, for instance when in enhanced CELL_FACH state, and a network node 610 that is adapted to assist in such a conditional CQI transmission procedure.

It is to be understood that both the UE 600 and the network node 610 presented in FIG. 6 only give a general, simplified picture of the two exemplary interacting entities, where the two entities comprise a number of generic units, while other units that may normally be necessary for obtaining a conventional communication between a UE and a network node that are not necessary for the understanding of the suggested CQI mechanism have been omitted for simplicity reasons.

UE 600 comprises a rule updating unit 601 which is adapted to update one or more relevant CQI triggering rules 602 that are stored in the UE 600, in response to having received relevant rule specific information from a network node 610 via a communication unit 603. UE 600 also comprises a CQI triggering unit 604, which is adapted to trigger a processing unit 605 to generate a CQI in response to two or more relevant triggering conditions being fulfilled, wherein the triggering conditions may include the fact that the UE is in enhanced CELL_FACH mode, and to transmit the generated CQI to the network node 610 via the communication unit 603.

The network node 610 is adapted to configure the rules for CQI transmissions of the UEs when required, and therefore it comprises an updating unit 611, which is adapted to update rule specific information on the basis of the relevant CQI triggering rules and conditions 612 stored at the network node 610. Upon having derived some rule specific information that needs to be updated, the updating unit 611 is adapted to update the relevant rules and conditions 612, as well as to transmit the updated information to the UE 600 via a communication unit 613. The network node 610 also comprises a processing unit 614 for processing a CQI that has been received from the UE 400 in a conventional manner.

As to the CQI reporting mechanism that is used in step 205 of FIG. 2, it is normally not desirable to have a separate channel to carry the CQI in the uplink. Therefore one possible option for the UE reporting a CQI is to use either the RACH or the E-DCH channel for this purpose. Alternatively, a piggybacked CQI may be used when executing the CQI reporting from the UE to the network node.

It is commonly known that networks of today do not allow CQI reporting over RACH. RACH may, however, be adapted for CQI reporting if the RACH format is slightly modified According to one embodiment, a new field may therefore be added in the state of the RACH channel to allow the possibility of reporting CQI via RACH. Such a modified version may then represent a new RACH format, which could be used by the UE for transmitting CQI's via RACH.

In addition, by limiting the number of bits used by RACH, the CQI reporting range may be reduced. Another possibility could be to send CQIs using the Radio Resource (RRC) layer, which terminates in the RNC on the network side, wherein the RNC will be sending the CQI back to the base station over the Iub interface. Alternatively, the CQI may be sent in the Medium Access Control (MAC) layer e.g. in the MAC header.

E-DCH transmission may be used for the discussed purpose as a combination of using the E-DCH Physical Control Channel (E-DPCCH) for carrying physical layer control information, such as e.g. resource allocation information, and of using the E-DCH Physical Data Channel (E-DPDCH) for carrying data in the uplink. According to this alternative option the UE may send CQIs using either the E-DPCCH, or the E-DPDCH. In the former case a new E-DPCCH format, accommodating bits for CQI reports, may be defined.

In case of CQI transmissions via E-DPDCH, the CQI may instead be transmitted using RRC signaling, which will end up in the RNC on the network side, wherein the RNC is adapted to send the CQI back to the base station over the Iub interface.

Another alternative way of sending CQIs to the network is to use the MAC layer of the E-DPDCH, wherein the CQI may be sent either in the MAC header or in the form of a separate MAC PDU. One advantage with this alternative is that MAC terminates in the base station, where scheduling, which requires CQI content, is performed. If CQI reception and scheduling are executed in the same node the CQI can be readily provided to the scheduler, which will be able to use the CQI content for channel dependent scheduling, thereby reducing the delay between when the CQI is received and the content of the CQI is used by the scheduler. Secondly, the overhead, complexity, and signaling resulting from using the MAC layer are minimized compared to other options.

According to yet another alternative embodiment, piggy-backed CQI transmissions may be used, wherein such a transmission mode is used only in situations where there is an uplink data transmission in progress. In present enhanced CELL_FACH the uplink data transmission takes place over E-DCH. Thus, CQIs may be carried over E-DCH, or more specifically, over E-DPDCH, in case the UE is sending data in the uplink. Furthermore, the CQI can be sent in the MAC of E-DCH, typically in the MAC header or the MAC PDU. If there is padding in the MAC PDU, the CQI could also, as another option, be included in the padding, without requiring any additional transmission costs. A special value of the L field of the MAC-i/is header may then be used to point out that a CQI report is included in the padding.

The difference of the latter alternative transmission method compared to the earlier embodiments is that instead of having the CQI transmissions triggering an E-DCH transmission, it is the data transmissions that trigger the CQI reporting. The piggybacked method may be used in combination with any of the CQI reporting rules described above. This means that a CQI can at most be reported when there is an ongoing uplink data transmission, and one or more of the CQI triggering conditions or rules are fulfilled. For instance, the UE may be adapted to report a CQI to the network according to the broadcasted probability suggested above, when data is transmitted in the uplink.

Another way of combining piggybacking with a CQI trigger is to always transmit the CQI on occasions when it can be transmitted as part of the padding for no additional cost. The triggers are then set to activate a transmission of additional CQI reports also when there is no data to transmit in the uplink.

It is to be understood that although this document is focusing on exemplifying different HSDPA reception scenarios, the described enhanced performance requirements are not only confined to HSDPA. In fact the suggested enhanced requirements are prevalent also for a number of other reception scenarios, such as e.g. DCH, MBMS and E-DCH downlink channels.

It is also to be understood that the present embodiments are to be considered in all respects as illustrative and not restrictive, and all changes coming within the meaning and equivalency range are intended to be embraced therein.

In addition, while the generic functions described in this document have been associated with units referred e.g. as a "CQI triggering unit" and a "Rule updating unit", these units, as well the remaining text of the description is generally only intended to illustrate the inventive concept and should not be taken as limiting the scope of the described concept, which is defined by the appended claims.

ABBREVIATIONS LIST

BCH Broadcast Channel
BCCH Broadcast Control Channel
CELL_DCH state Cell Dedicated Channel state
CELL_FACH state Cell Forward Access Channel state
CELL_PCH state Cell Paging Channel state
CPICH Common Pilot Channel
CQI Channel Quality Indicator
E-DCH Enhanced Dedicated Channel
E-HICH E-DCH HARQ Acknowledgement Indicator Channel
E-AGCH E-DCH Absolute Grant Channel
E-DPCCH E-DCH Physical Control Channel
E-DPDCH E-DCH Physical Data Channel
F-DPCH Fractional Dedicated Channel
HSDPA High Speed Downlink Packet
HS-DPCCH High Speed Dedicated Physical Control Channel
HS-PDSCH High Speed Physical Downlink Shared Channel
HS-DSCH High Speed Downlink Shared Channel
MAC Medium Access Control
RRC Radio Resource Control
SINR Signal-to-Interference and Noise Ratio
TB Transport Block
TTI Transmission Time Interval

The invention claimed is:

1. A method for limiting Channel Quality Indicator (CQI) reporting from a User Equipment (UE) to a network node, the method comprising:
   transmitting, by the UE, at least one CQI report to the network node when the UE is operating in a discontinuous reception (DRX) mode, wherein
   the at least one CQI report is triggered according to one or more CQI reporting trigger rules,
   at least one of the one or more CQI reporting trigger rules is based on a scaled CQI feedback cycle $\Psi$ defined as $\Psi = T \times \mu$, where T is a basic CQI feedback cycle and $\mu$ is a scaling factor, enabling dynamic scaling of the CQI feedback cycle, and
   the scaling factor is provided to the UE by the network node.

2. The method according to claim 1, wherein the scaling factor is provided to the UE in any of the following forms:
   as a cell specific value that is valid for all low activity states in a respective cell, or
   as at least one state specific value, each of which is valid for a specific state.

3. The method according to claim 1, wherein in addition to the scaled CQI feedback cycle, the at least one of the one or more CQI reporting trigger rules is based on a random transmission value to be used by the UE for randomly transmitting a first CQI report.

4. The method according to claim 3, wherein the random transmission value is a value between 0 and $\Psi$.

5. A method, by a network node, for limiting Channel Quality Indicator (CQI) reporting from a User Equipment (UE) to the network node, the method comprising:
   configuring, by providing a scaling factor to the UE, a rule for triggering the UE to report CQIs when the UE is operating in a discontinuous reception (DRX) mode, wherein
   the rule for triggering the UE to report the CQIs is based on a scaled CQI feedback cycle $\Psi$ defined as $\Psi = T \times \mu$, where T is a basic CQI feedback cycle and $\mu$ is the scaling factor, enabling dynamic scaling of the CQI feedback cycle.

6. The method according to claim 5, wherein the scaling factor is provided to the UE in any of the following forms:
   as a cell specific value that is valid for all low activity states in a respective cell, or
   as at least one state specific value, each of which is valid for a specific state.

7. The method according to claim 5, wherein in addition to the scaled CQI feedback cycle, the rule for triggering the UE to report the CQIs is based on a random transmission value to be used by the UE for randomly transmitting a first CQI report.

8. The method according to claim 7, wherein the random transmission value is a value between 0 and $\Psi$.

9. A User Equipment (UE) for limiting Channel Quality Indicator (CQI) reporting from the UE to a network node, the UE comprising:
- a communication unit configured to transmit at least one CQI report to the network node when the UE is operating in a discontinuous reception (DRX) mode, wherein:
- the at least one CQI report is triggered according to one or more CQI reporting trigger rules,
- at least one of the one or more CQI reporting trigger rules is based on a scaled CQI feedback cycle $\Psi$ defined as $\Psi=T\times\mu$, where T is a basic CQI feedback cycle and $\mu$ is a scaling factor, enabling dynamic scaling of the CQI feedback cycle, and
- the communication unit is configured to be provided with the scaling factor from the network node.

10. The UE according to claim 9, wherein the scaling factor is provided in any of the following forms:
- as a cell specific value that is valid for all low activity states in a respective cell, or
- as at least one state specific value, each of which is valid for a specific state.

11. The UE according to claim 9, wherein in addition to the scaled CQI feedback cycle, the at least one of the one or more CQI reporting trigger rules is based on a random transmission value to be used by the UE for randomly transmitting a first CQI report.

12. The UE according to claim 11, wherein the random transmission value is a value between 0 and $\Psi$.

13. A network node for limiting Channel Quality Indicator (CQI) reporting from a User Equipment (UE) to the network node, the network node comprising:
- a communication unit configured to configure, by providing a scaling factor to the UE, a rule for triggering the UE to report CQIs when the UE is operating in a discontinuous reception (DRX) mode, wherein
- the rule for triggering the UE to report the CQIs is based on a scaled CQI feedback cycle $\Psi$ defined as $\Psi=T\times\mu$, where T is a basic CQI feedback cycle and $\mu$ is the scaling factor, enabling dynamic scaling of the CQI feedback cycle.

14. The network node according to claim 13, wherein the scaling factor is provided to the UE in any of the following forms:
- as a cell specific value that is valid for all low activity states in a respective cell, or
- as at least one state specific value, each of which is valid for a specific state.

15. The network node according to claim 13, wherein, in addition to the scaled CQI feedback cycle, the rule for triggering the UE to report the CQIs is based on a random transmission value to be used by the UE for randomly transmitting a first CQI report.

16. The network node according to claim 15, wherein the random transmission value is a value between 0 and $\Psi$.

* * * * *

UNITED STATES PATENT AND TRADEMARK OFFICE
CERTIFICATE OF CORRECTION

PATENT NO. : 11,469,833 B2
APPLICATION NO. : 15/097710
DATED : October 11, 2022
INVENTOR(S) : Kazmi et al.

It is certified that error appears in the above-identified patent and that said Letters Patent is hereby corrected as shown below:

On the Title Page

On Page 2, in Item (56), under "OTHER PUBLICATIONS", in Column 2, Line 24, delete "2009" and insert -- 2009, --, therefor.

In the Drawings

On Fig. 6, Sheet 5 of 5, delete " [605 CQI Triggering Unit] " and insert -- [604 CQI Triggering Unit] --, therefor.

In Fig. 6, Sheet 5 of 5, delete " [614 Updating Unit] " and insert -- [611 Updating Unit] --, therefor.

In the Specification

In Column 1, Line 9, delete "2013," and insert -- 2013, now U.S. Pat. No. 9,338,676 --, therefor.

In Column 1, Line 31, delete "Packet" and insert -- Packet Access --, therefor.

In Column 2, Line 48, delete "advance" and insert -- advanced --, therefor.

In Column 3, Line 44, delete "Channel" and insert -- Physical Channel --, therefor.

In Column 5, Line 21, delete "criteria" and insert -- criterion --, therefor.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,469,833 B2

In Column 5, Line 57, delete "that is" and insert -- that it --, therefor.

In Column 5, Line 58, delete "HSPDA" and insert -- HSDPA --, therefor.

In Column 6, Line 28, delete "FIG. 2," and insert -- FIGS. 2, --, therefor.

In Column 6, Line 52, delete "CELL-FACH" and insert -- CELL_FACH --, therefor.

In Column 6, Lines 66-67, delete "CELL FACH" and insert -- CELL_FACH --, therefor.

In Column 6, Line 67, delete "CELL DCH" and insert -- CELL_DCH --, therefor.

In Column 7, Line 1, delete "CELL DCH" and insert -- CELL_DCH --, therefor.

In Column 7, Line 42, delete "more that" and insert -- more than --, therefor.

In Column 10, Line 32, delete "random trails" and insert -- random trials --, therefor.

In Column 10, Line 57, delete "delayed the" and insert -- delayed at the --, therefor.

In Column 13, Line 5, delete "it's" and insert -- its --, therefor.

In Column 14, Line 20, delete "UE 400" and insert -- UE 600 --, therefor.

In Column 14, Line 36, delete "CQI's" and insert -- CQIs --, therefor.

In Column 14, Line 39, delete "Resource" and insert -- Resource Control --, therefor.

In Column 15, Line 53, delete "as well" and insert -- as well as --, therefor.

In Column 16, Line 6, delete "Channel" and insert -- Physical Channel --, therefor.

In Column 16, Line 7, delete "Packet" and insert -- Packet Access --, therefor.

In the Claims

In Column 16, Line 29, in Claim 1, delete "$\Psi$defined" and insert -- $\Psi$ defined --, therefor.

In Column 16, Line 56, in Claim 5, delete "$\Psi$defined" and insert -- $\Psi$ defined --, therefor.

In Column 17, Line 17, in Claim 9, delete "$\Psi$defined" and insert -- $\Psi$ defined --, therefor.

In Column 18, Line 13, in Claim 13, delete "$\Psi$defined" and insert -- $\Psi$ defined --, therefor.